United States Patent
Velusamy et al.

(10) Patent No.: US 9,208,454 B2
(45) Date of Patent: Dec. 8, 2015

(54) SYSTEM AND METHOD FOR PROVIDING A UNIFIED MESSAGING AND MODELING INFRASTRUCTURE

(75) Inventors: Umashankar Velusamy, Tampa, FL (US); Amritham Koduvayur, Tampa, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 670 days.

(21) Appl. No.: 12/982,393

(22) Filed: Dec. 30, 2010

(65) Prior Publication Data

US 2012/0173354 A1 Jul. 5, 2012

(51) Int. Cl.
- *G06Q 30/00* (2012.01)
- *G06Q 10/00* (2012.01)
- *G06Q 30/06* (2012.01)

(52) U.S. Cl.
CPC ............ *G06Q 10/00* (2013.01); *G06Q 30/00* (2013.01); *G06Q 30/0601* (2013.01)

(58) Field of Classification Search
CPC ............................. G06Q 30/00; G06Q 10/00
USPC ................................................. 705/26.1–27.2
See application file for complete search history.

(56) References Cited

U.S. PATENT DOCUMENTS

| | | | |
|---|---|---|---|
| 5,794,234 A * | 8/1998 | Church et al. | |
| 2005/0015771 A1 * | 1/2005 | Bagsby | 718/106 |
| 2007/0150480 A1 * | 6/2007 | Hwang et al. | 707/10 |
| 2009/0193057 A1 * | 7/2009 | Maes | 707/200 |
| 2010/0145718 A1 * | 6/2010 | Elmore et al. | 705/1.1 |

OTHER PUBLICATIONS

Martin, S. J., Danner, R. A., & Dang, T. T. Web based management of host computers in an open protocol network Retrieved from http://search.proquest.com/docview/30913148?accountid=14753.*

* cited by examiner

*Primary Examiner* — Kathleen Palavecino

(57) ABSTRACT

A system and method for providing a unified messaging and modeling infrastructure (UMMI) is disclosed. The system may comprise an input module of a first operations support system configured to receive information for processing at the first operations support system and a processor module of the first operations support system configured to process the information received at the first input module and an output module of the first operations support system configured to transmit a standardized data sheet to the second operations support system. The system may comprise an input module of the second operations support system configured to receive the standardized data sheet and a processor module of the second operations support system configured to update the standardized data sheet based on processing operations at the second operations support system and to generate executable code to support interface functionality based on definitions of the standardized data sheet.

23 Claims, 6 Drawing Sheets

SYSTEM AND METHOD FOR PROVIDING A UNIFIED MESSAGING AND MODELING INFRASTRUCTURE

BACKGROUND INFORMATION

Large corporations have Information Technology (IT) departments that utilize multiple IT applications and systems to support various business operations, such as order entry, provisioning, billing, and activation. Although these applications and systems perform specialized support functions to achieve various business needs without having to rely on external vendors, current systems and methods are often time-consuming and costly especially in situations where a new product is being launched. For example, flowing an order for a new product typically involves establishing attributes and interface definitions between the two or more applications and systems, as well as defining flow for all the applications and systems. Because each application and system typically involves generating separate data elements, building validations, creating graphical user interfaces, and building business logic, even a simple change to an existing product (e.g., adding an attribute to that order) tends to lengthen the release cycle of the product. Inconsistencies and defects in production often result as well. Current systems and methods do not provide a comprehensive and efficient way to provide a unified messaging and modeling infrastructure (UMMI) for IT applications and systems across a platform of specialized support tools and processes.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Figure 1:
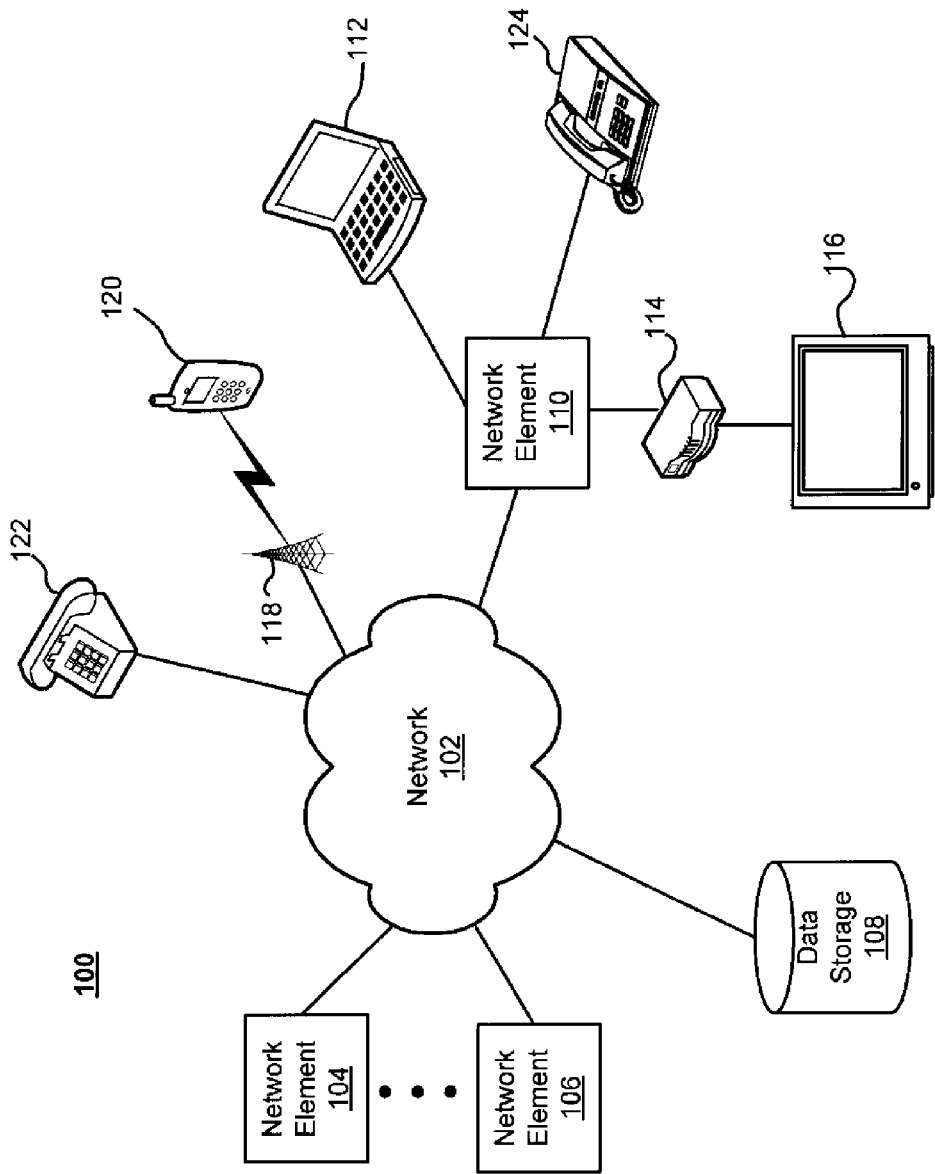
FIG. 1 depicts a block diagram of a system architecture for providing a unified messaging and modeling infrastructure (UMMI), according to an exemplary embodiment.

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing a unified messaging and modeling infrastructure (UMMI). That is, exemplary embodiments may, among other things, expand and optimize systems management within distributed computing environments by comprehensively and effectively providing a unified messaging and modeling infrastructure (UMMI) to facilitate and streamline IT applications and systems, especially for consistent and efficient business support for ordering, provisioning, billing, and activation.

As discussed above, IT applications and systems may support various business operations, such as order entry, provisioning, billing, and activation. However, current systems and methods may be time-consuming and costly, especially in situations where a new product is being launched. For example, flowing an order for a new product may involve establishing attributes and interface definitions between the two or more applications and systems, as well as defining flow for all the applications and systems. Each system involved may also create separate data elements, build validations for the data elements, create the graphical user interfaces (GUIs) required, and build the business logic depending on their understanding of the interface as advised by the interfacing systems. Since interaction takes place between individual systems, potential for inconsistencies in the data attributes may be high. For example, an element, such as a circuit identfication, which may have been defined as 30 characters long in the order entry system, may be defined with greater or lesser characters in various downstream applications and systems. Similarly, some systems may allow certain special characters while other may not. In short, since each application and system performs a variety of similar functions distinctly and separately (e.g., generating separate data elements, building validations, creating graphical user interfaces, building business logic to support, etc.), even a simple change to an existing product, such as adding an attribute to that order, may lengthen a release cycle of the product.

For any new product launch, configuration of the applications and systems that support ordering, provisioning, and billing system, for example, may typically follow this ten-step procedure:

(1) Business Requirements ("BREQs") may be documented;
(2) All the TT Systems impacted may be identified;
(3) Each of the systems may understand the BREQs that impacts them and determine the changes;
(4) Architects from each domain may determine how flow of an order for a new product should happen;
(5) Each system may undergo a requirements/Joint Application Design ("JAD") session and prepare an Interface Control Definition Document, detailing the steps involved in interface & the data that is exchanged, where the format of data exchange may differ between the systems depending on the middleware used between the systems;
(6) Each system may develop their code and construct its respective database design and business logic;
(7) All the systems may perform integration testing in the development environment;
(8) Testing teams may be brought in to perform integration testing and build test cases for automated testing;
(9) Tickets may be raised and bugs may be fixed; and
(10) After deployment, any small change involving any interface may be mapped to subsequent major/minor releases where the steps These actions may take anywhere from approximately three (3) months to a year to complete, depending on complexity of the project. Since multiple applications and systems may be involved in completing these actions, communication gaps may result due to data attribute modeling being different in different system, and in turn, leading to bugs that may be very expensive to detect and resolve. In addition, testing the developed code may also be effort and resource intensive.

According to various embodiments, a unified messaging and modeling infrastructure (UMMI) may provide a streamlined approach for business support applications and systems that is comprehensive, efficient, and resource savvy. A unified messaging and modeling infrastructure (UMMI) may also eliminate, mitigate, or preempt traditional inefficiencies associated with traditional techniques. For simple changes, embodiments for providing a unified messaging and modeling infrastructure (UMMI) may eliminate a need for manual effort while reducing time-to-market, especially for complex changes or for launching a new product. In addition, other benefits and advantages may be realized, such as reduced post-production defects, improvement in quality, and standardization of interfaces involved.

FIG. 1 depicts a block diagram of a system architecture for providing a unified messaging and modeling infrastructure (UMMI), according to an exemplary embodiment. As illustrated, network 102 may be communicatively coupled with one or more devices including network element 104, network element 106, data storage 108, and network element 110. Other devices may be communicatively coupled with network 102 via one or more intermediary devices, such as transceiver 118, network element 110, or a wireline phone 122. Wireless device 120 may be communicatively coupled with network 102 via transceiver 118. Network client 112 and set-top box 114 may be communicatively coupled with network 102 via network element 110. Wireless control 110 may be communicatively coupled with set-top box 114 via infrared, Bluetooth communication, or other wireless technologies. A video display (e.g., television set 116) may be communicatively coupled to set-top box 114. It should also be appreciated that other various components may also be communicatively coupled with the network element 110, such as a Voice over Internet Protocol ("VoIP") phone 124.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VOIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an IEEE Ethernet 802.3.

Transceiver 118 may be a repeater, a microwave antenna, a cellular tower, or another network access device capable of providing connectivity between to different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Wireless device 120 may be a mobile communications device, wireline phone, a cellular phone, a mobile phone, a satellite phone, a personal digital assistant ("PDA"), a computer, a handheld MP3 player, a handheld multimedia device, a personal media player, a gaming device, or other devices capable of communicating with network 102 via transceiver 118.

Network elements, transceiver 118, data storage 108, and set-top box 114 may include one or more processors for recording, transmitting, receiving, or storing data. Although network elements, transceiver 118 and data storage 108 are depicted as individual elements, it should be appreciated that the contents of one or more of a network element, transceiver 118, and data storage 108 may be combined into fewer or greater numbers of devices and may be connected to additional devices not depicted in FIG. 1. Furthermore, the one or more devices may be local, remote, or a combination thereof a first network elements, transceiver 118, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104, 106, and 110 may be one or more servers (or server-like devices), such as a Session Initiation Protocol ("SIP") server. Network elements 104, 106, and 110 may include one or more processors (not shown) for recording, transmitting, receiving, or storing data. According to one or more embodiments, network elements 104, 106, and 110 may be servers providing media content to one or more users. In other embodiments, network elements 104, 106, and 110 may be servers that provide network connection between two or more wireless devices 118. Network elements 104, 106, and 110 may also be servers of a service provider, the Internet, a broadcaster, a cable television network, or another media provider.

Network element 110 may be a residential gateway, such as a router, an optical network terminal or another piece of Customer Premises Equipment ("CPE") providing access to one or more pieces of equipment. For example, network element 110 may provide audio/video programming content feeds to a set-top box, such as set-top box 116. Network element 110 may also provide network connectivity for other clients, such as a Voice Over IP ("VOIP") phone (not shown) and a network client, e.g., network client 112.

Network client 112 may be a desktop computer, a laptop computer, a server, a personal digital assistant, or other computer capable of sending or receiving network signals (e.g., CPE, a television, radio, phone, appliance, etc.). Network client 112 may use a wired or wireless connection. It should also be appreciated that the network client 112 may be a portable electronic device capable of being transported. For example, these may include a digital picture frame, an electronic reader device, or other portable device. Such a device may transmit or receive signals and store information in transit, and in the event it is transported out of the unit, the portable electronic device may still operate using the data (e.g., digital image, electronic book, etc.) it stored. Although depicted as connected via a residential gateway in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards.

System 100 may be used for mobile telecommunications between two or more components of the system 100, e.g., two or more wireless devices, wireless device with network client, set top box with wireless device, landline phone, VoIP, etc. System 100 may also be used for transmitting or receiving a variety of content. The various components of system 100 as shown in FIG. 1 may be further duplicated, combined or integrated to support various applications and platforms. Additional elements may also be implemented in the systems described above to support various applications.

Figure 2:
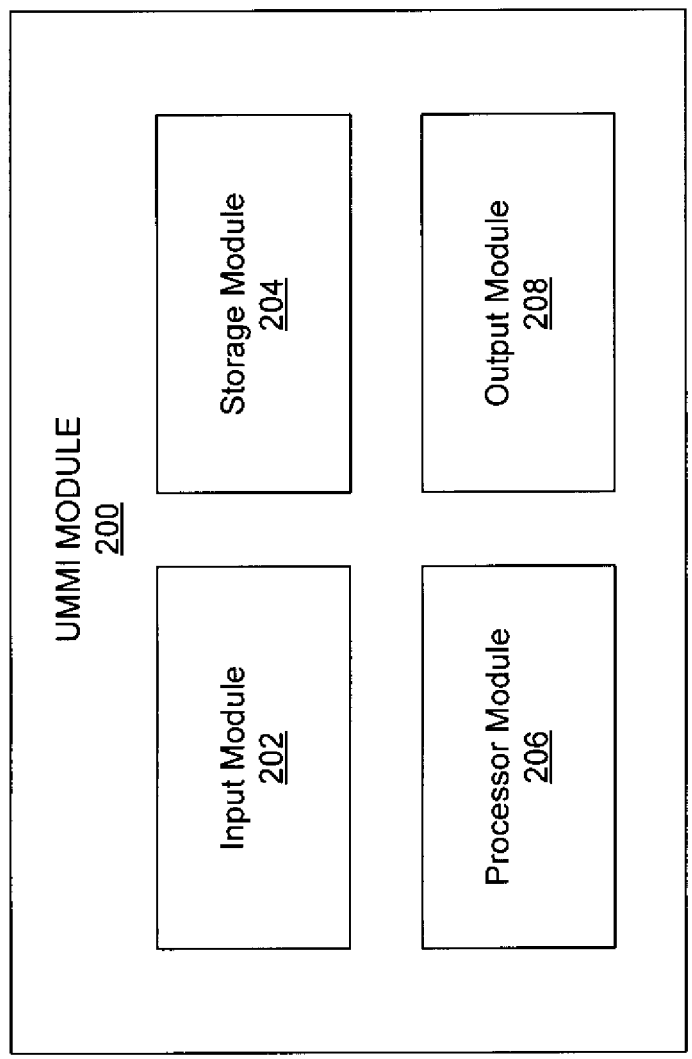
FIG. 2 depicts a hardware module component of a system for providing a unified messaging and modeling infrastructure (UMMI), according to an exemplary embodiment.

FIG. 2 depicts a hardware module component of a system for providing a unified messaging and modeling infrastructure (UMMI), according to an exemplary embodiment. Referring to FIG. 2, there is shown a UMMI module 200 for providing a unified messaging and modeling infrastructure (UMMI). As illustrated, the UMMI module 200 may comprise one or more components, such as an input module 202, a storage module 204, a processor module 206, and an output module 208. Although the UMMI module 200 is depicted as a single module, the UMMI module 200 may be incorporated as a single component or may be distributed across a plurality of physical components, such as one or more centralized servers, pieces of customer premises equipment (CPE), operations support systems (OSSs), or end user devices. In some embodiments, the UMMI module 200 may be utilized in a virtual environment or as software.

The description below describes network elements, computers, and components of a system of and method for providing a unified messaging and modeling infrastructure (UMMI) that may include one or more modules. As used herein, the term "module" may be understood to refer to non-transitory executable software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and duplicated to support various applications. Also, a function described herein as being performed at a particular module may be performed at one or more other modules and by one or more other devices instead of or in addition to the function performed at the particular module. Further, the modules may be implemented across multiple devices and other components local or remote to one another. Additionally, the modules may be moved from one device and added to another device, and may be included in both devices.

Input module 202 may receive one or more inputs. These may include input information associated with an order for a product or service at an order entry application or system. Storage module 204 may manage or access the one or more inputs using electronic storage, including databases or other organized electronic storage. Storage module 204 may provide one or more interfaces for the input module 202, processor module 206, or output module 208. Storage module 204 may store any data associated with the input module 202, processor module 206, and output module 208. Storage module 204 may be or may be communicatively coupled to one or more physical media, such as, but not limited to a data storage unit, a server, a compact disc (CD), a digital versatile disc (DVD), a floppy disk, a hard drive, read only memory (ROM), random access memory (RAM), as well as other physical media capable of storing software, data, other storage information, or combinations thereof.

Processor module 206 may process data. For example, processor module 206 may generate one or more tables for the information associated with the order. The processor module 206 may also determine standardizing parameters to be used at one or more additional operations support systems (OSSs). Processing at the processor module 206 may be based on information from the input module 202, the storage module 204, processor module 206, and/or the output module 208.

Output module 208 may present a variety of information for presented. For example, the output module 208 may output the one or more tables created by the processor module 206 for use at other OSS subsystems. The output module 208 may also output one or more reports associated with a particular order to all corresponding subsystems communicatively coupled to one or more operations support systems (OSSs).

It should be appreciated that the system 100 of FIG. 1 and the system 200 of FIG. 2 may be implemented in a variety of ways. The architectures 100 and 200 may be implemented as a hardware component (e.g., as a module) within a network element or network box. It should also be appreciated that the architectures 100 and 200 may be implemented in computer executable software (e.g., on a computer-readable medium). Although depicted as a single architecture, module functionality of the architectures 100 and 200 may be located on a single device or distributed across a plurality of devices including one or more centralized servers and one or more pieces of customer premises equipment or end user devices.

As discussed above, traditional actions for any new product launch may take approximately ten (10) steps and anywhere from approximately three (3) months to a year to complete, depending on complexity of the project. However, using the UMMI module 200, steps 5-8, for example, may be simplified. Much of the effort typically involved for flowing a new product may be greatly reduced while standardizing data modeling and data exchange modeling. It should be appreciated that middleware typically used between systems may remain intact using the UMMI module 200.

For instance, architect(s) at the interfacing systems may prepare an infrastructure order document (e.g., a standardized data sheet which may contain the steps for processing an order, the attributes exchanged between systems, and additional information such as error codes) that will be inventoried at a central location for a given product. This document may contain details required to order flow for the new product. In the event a new product is ordered, for example, telephone numbers of customers and directory listing preferences may be generated. In this scenario, several actions may occur:

(1) The order entry system may collect name, address, and telephone numbers of customers and may release the order to provisioning system using a web service;
(2) The order may flow to provisioning system where an engineer calls customers to get preferences, updates the system, and activate, and where the provisioning system may send the order to billing system (e.g., using IBM MQ Series message oriented middleware); and
(3) The billing system may receive the order and start to bill the customer.

Although these three steps may generally take ten steps, as described above, the number of steps may be reduced since infrastructure for a flowing order may be sent using the UMMI module 200, which is communicatively coupled to the order, provisioning, and billing systems.

Figure 3A:
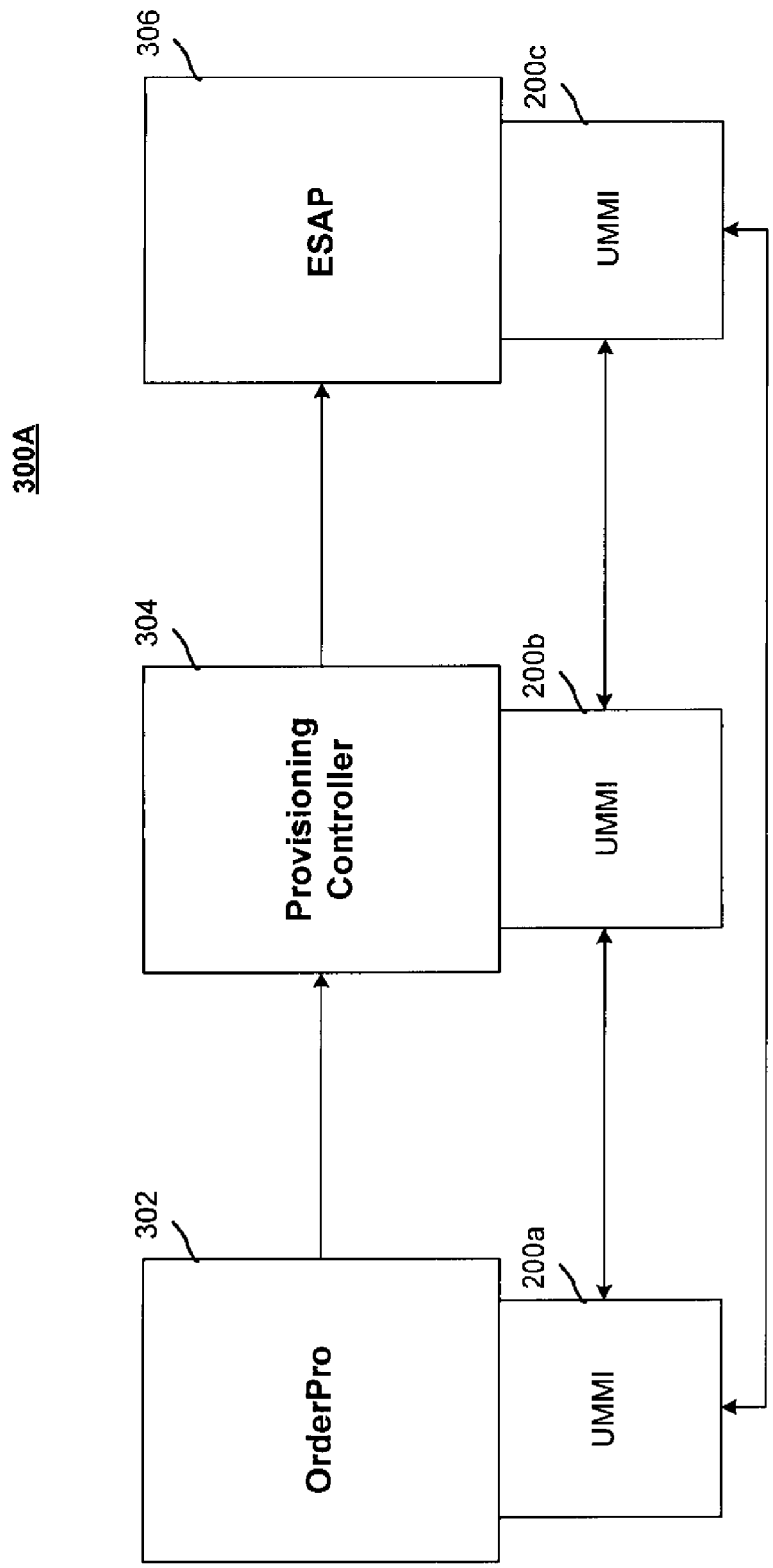
FIG. 3A-3C depict schematic flow diagrams for providing a unified messaging and modeling infrastructure (UMMI), according to an exemplary embodiment.
Figure 3B:
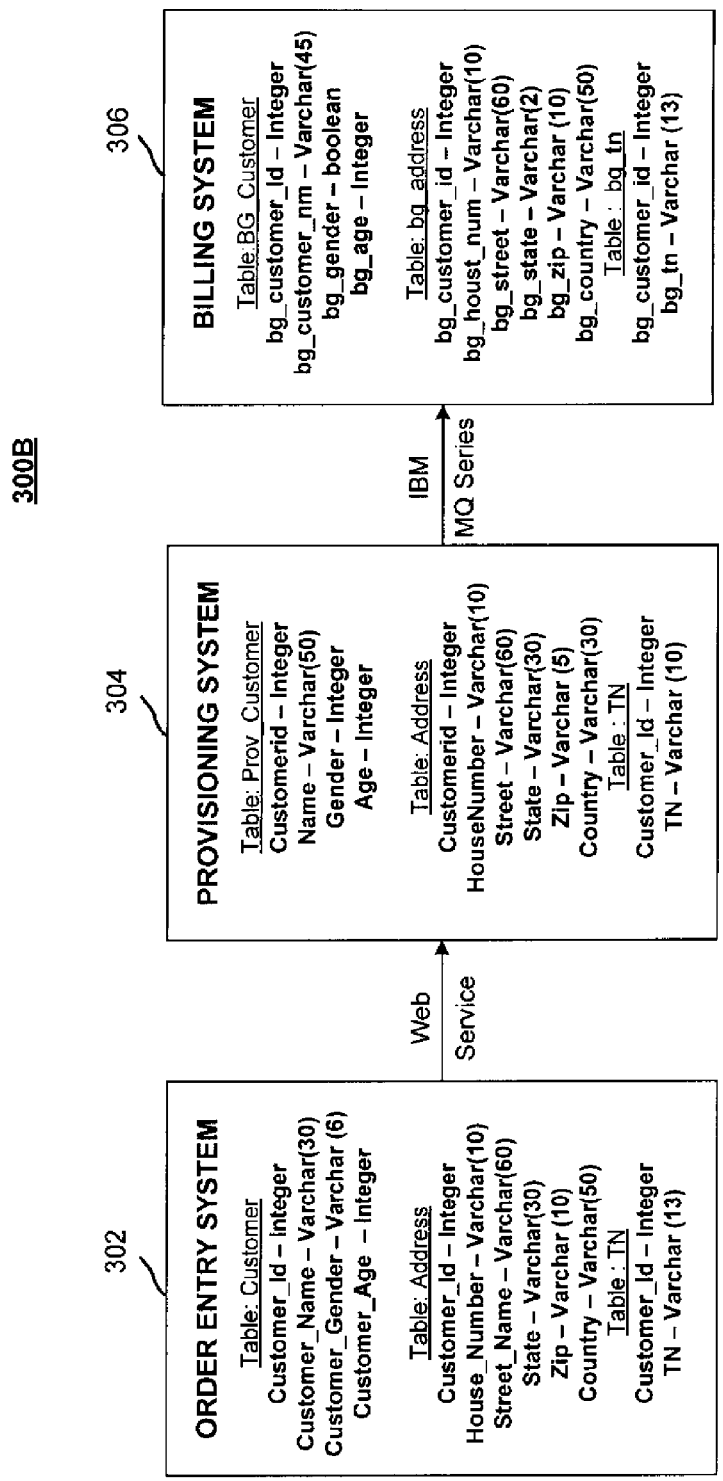
Figure 3C:
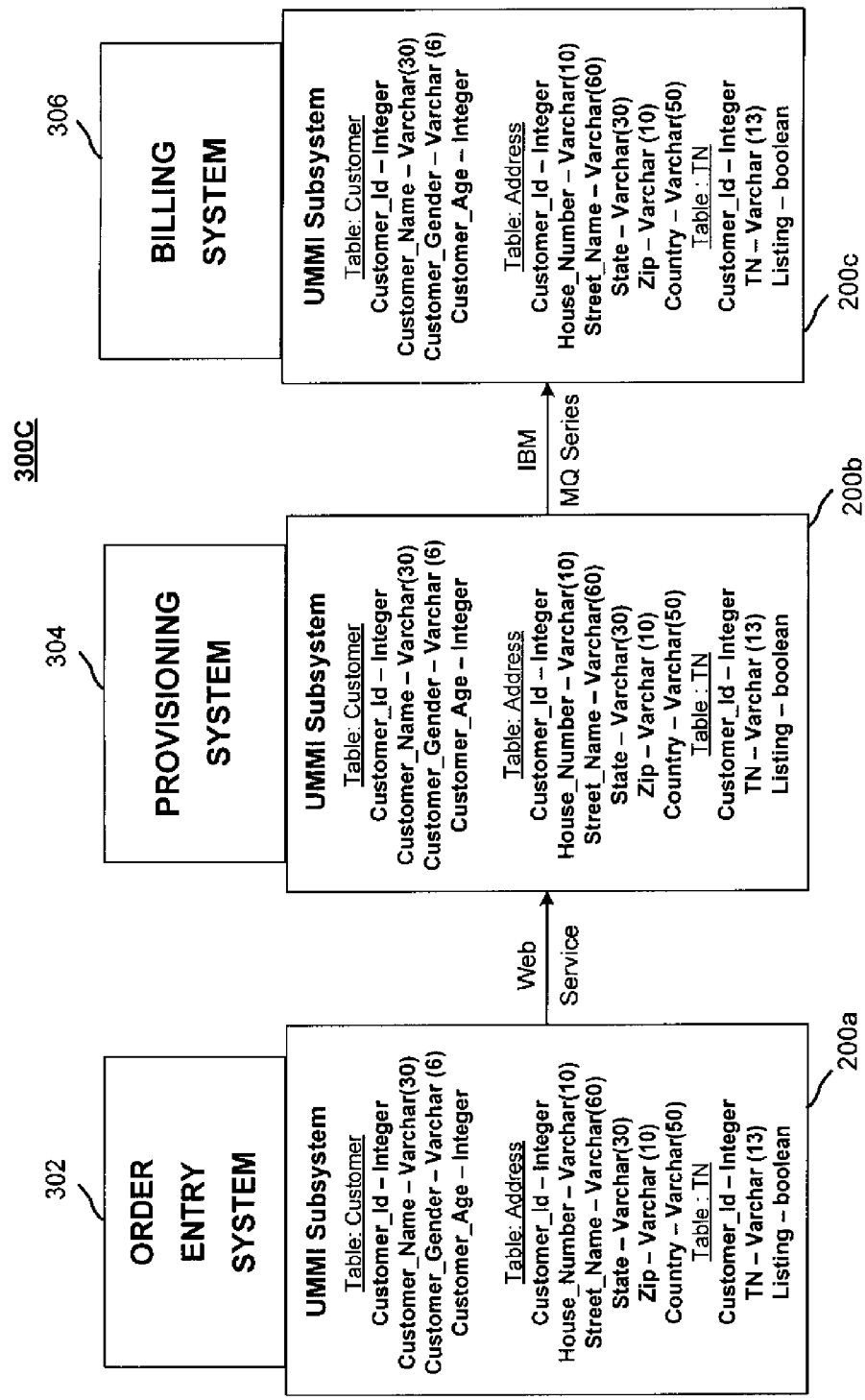

FIG. 3A-3C depict schematic flow diagrams for providing a unified messaging and modeling infrastructure (UMMI), according to an exemplary embodiment. FIG. 3A depicts a schematic flow diagram for providing a unified messaging and modeling infrastructure (UMMI) 300A, according to an exemplary embodiment. In this example, an ordering system 302 (e.g., OrderPro), a provisioning system 304 (e.g., Provisionally Controller), and a billing system 306 (e.g., ESAP) may be provided. It should be appreciated that a variety of other Operations Support Systems (OSSs) may also be provided. Communicatively coupled to each of these Operations Support Systems (OSSs) is the UMMI module 200. For instance, the UMMI module for ordering 200a may be communicatively coupled to the ordering system 302, the UMMI module for provisioning 200b may be communicatively coupled to the provisioning system 304, and the UMMI module for billing 200c may be communicatively coupled to the provisioning system 306. It should be appreciated that the UMMI module 200 may also be communicatively coupled to a variety of other Operations Support Systems (OSSs).

FIG. 3B depicts a schematic flow diagram for providing a unified messaging and modeling infrastructure (UMMI) 300B, according to an exemplary embodiment. In this example, an order entry system 302, provisioning system 304, and billing system 306 may perform a variety of functions. These may include generating tables for customers, addresses, etc., where each one of these OSS systems may do so independently and separately. As a result, differences in table naming convention, column names, and even in properties of attributes, such as length and data type, may result. It should also be appreciated that interface data definitions may need to be defined between systems, coded, and translated in order to flow an order. It should also be appreciated that a number of testing teams may be utilized to test the integrity of interfaces and data translations. Without a UMMI module 200 to provide a unified infrastructure, these functions and features simply would not be performed in an efficient manner, if at all.

FIG. 3C depicts a schematic flow diagram for providing a unified messaging and modeling infrastructure (UMMI) 300C, according to an exemplary embodiment. In this example, the UMMI module 200 may serve and function as a subsystem for each of the operations support systems (OSSs), such as an order entry system 302, provisioning system 304, and billing system 306 to perform the variety of functions typically required of the OSS systems. For example, a UMMI subsystem for order entry 200a, a UMMI subsystem for provisioning 200b, and a UMMI subsystem for billing 200c may be used to generate tables for customers, addresses, etc. Ultimately, the UMMI subsystems 200a-200c may provide a unified infrastructure to achieve and perform traditional features and functions of various operations support systems (OSSs) in an efficient manner.

For example, when the UMMI module in the ordering system 200a receives an infrastructure order (e.g., a standardized data sheet containing steps for processing an order, the attributes exchanged, and other data), a customer table, address table, and directory listing table may be created, as listed on the infrastructure order. If necessary, code (e.g., providing Graphical User Interface and Server functionality) may also be generated to transmit/receive data into these infrastructure tables. Other code and functionality which may be generated and implemented in response to an infrastructure order may include code for a web service interface, code to publish a web service interface, code to subscribe to or consume a web service interface, and error handling.

Any further changes may only require the infrastructure order to be updated and flown again. In other words, when changes are achieved, the interface infrastructure between the systems involved, graphical user interface (GUI), database infrastructure, and code to retrieve and update changes to the infrastructure tables may be automatically updated in order to process new orders with these changes. For instance, if the district name is to be added to the order, infrastructure (version 2) may be created with this additional attribute. When this order is flown across the various operations support systems, the "district name" column in the tables may be added to all the tables in the all the systems. As a result, the interface definitions between the systems based on middleware used may be automatically updated with a new version and corresponding code generated. It should be appreciated that APIs available to the host systems may also be updated along with any GUI being used.

Without UMMI, each system may read, translate, and store data in different formats. Coding between the interfaces to exchange data may also be required, as well additional testing efforts. Further discussions between OSS teams belonging to different user groups may also be required.

With UMMI, the UMMI subsystem may coexist within each of the interfacing systems that use the middleware currently used by the applications and systems. Data attribute properties may be standardized and used similarly across the board for all applications and systems with which the UMMI subsystems are communicatively coupled. Values of the data attributes may be consistent, regardless of which systems are used. In addition, data definitions may be defined in the infrastructure order, which may flow through the systems to auto-configure interface definitions, interface code, database tables, and hooks to the host system to retrieve, perform business logic, and update data when the task is complete. Since the UMMI subsystem is standardized, and the steps are defined in the infrastructure, automated test cases building and test execution are made easy.

The UMMI module 200 may coexist as subsystems of the host applications or systems, thus augmenting business function, standardizing data delivery and communication capabilities using an application or system's current middleware while concurrently offering centralized data, interface, and flow management.

In short, by using a UMMI module 200 at each OSS, a unified messaging and modeling infrastructure may be provided. It should be appreciated that a unified report or output may be generated, such as a central spreadsheet for facilitating viewing the order flow or maintenance issues. In addition, the UMMI module may utilize the spreadsheet to create or update tables, create or update interface definitions, generate code, generate hooks for system customization, generate the GUI, compile and hot deploy staging and active versions of the infrastructure. Versioning, automated testing, central reporting, and incremental enablement of features may also be supported.

According to various embodiments, a unified messaging and modeling infrastructure (UMMI) may provide a streamlined approach for business support applications and systems that is comprehensive, efficient, and resource savvy. A unified messaging and modeling infrastructure (UMMI) may also eliminate, mitigate, or preempt traditional inefficiencies associated with traditional techniques. For simple changes, embodiments for providing a unified messaging and modeling infrastructure (UMMI) may eliminate a need for manual effort while reducing time-to-market, especially for complex changes or for launching a new product. In addition, other benefits and advantages may be realized, such as reduced post-production defects, improvement in quality, and standardization of interfaces involved.

While a UMMI system may not replace existing IT applications and systems or eliminate all costs associated with product launch, implementation of a UMMI system may augment and ehnace existing IT systems and applications to deliver products at faster rates, reduce product development time as a result of standardization, reduce cost associated with a product cost as well as overhead by automating repeated tasks. Ultimately, the number of initiatives delivered per annum may be increased using a UMMI system.

It should also be appreciated that the scheduling may be automatic or a combination of manual and automatic. In an automatic embodiment, the a unified messaging and modeling infrastructure (UMMI) module 200 may automatically determine the best date/time to install the one or more applications onto the new replacement computing device. The a unified messaging and modeling infrastructure (UMMI) module 200 may determine such date/time based on a variety of factors, such as network/system availability, queue of other action items, when a new replacement computing device is needed, etc. In a manual-automatic embodiment, the user 302 may enter a date or time range and the a unified messaging and modeling infrastructure (UMMI) module 200 may automatically determine the exact date/time for application installation. Other various embodiments may also be provided to maximize network resources, minimize installation or replacement time, and improve overall efficiency.

While embodiments described above are primarily directed to providing a unified messaging and modeling infrastructure (UMMI) as a subsystem to one or more operations support systems (OSSs), it should be appreciated that the a unified messaging and modeling infrastructure (UMMI) module 200 may also be used for other various systems. In addition, the UMMI systems and methods described herein may also be used as a stand-alone system without use of any other various systems.

Other various embodiments and considerations may also be provided to optimize the unified messaging and modeling infrastructure (UMMI) described herein. It should also be appreciated that installations using a unified messaging and modeling infrastructure (UMMI) may be configured for operation by one or more customers, analysts, operators, or administrators. In other embodiments, the a unified messaging and modeling infrastructure (UMMI) may be entirely automatic or may be a combination of manual and automatic features, some embodiments of which are described above.

While depicted as various servers, components, elements, modules, or devices, it should be appreciated that embodiments may be constructed in software or hardware, as a separate or stand-alone device, or as part of an integrated system, device, or tool.

Additionally, it should also be appreciated that system support and updating the various components of the system or tool may be achieved. For example, a system administrator may have access to one or more of the components of the system, network, components, elements, or device. It should also be appreciated that the one or more servers, components, elements, or devices of the system may not be limited to physical components. These components may be computer-implemented software-based, virtual, etc. Moreover, the various servers, components, elements, or devices may be customized to perform one or more additional features and functionalities. Such features and functionalities may be provided via deployment, transmitting or installing software or hardware.

It should also be appreciated that each of the communications devices, servers, modules, or network elements may include one or more processors. It should be appreciated that one or more data storage systems (e.g., databases) may also be coupled to each of the devices or servers of the system. In one embodiment, the one or more data storage systems may store relevant information for each of the servers and system components. It should also be appreciated that software may be implemented in one or more computer processors, modules, network components, services, devices, or other similar systems.

It should be appreciated that the contents of any of these one or more data storage systems may be combined into fewer or greater numbers of data storage systems and may be stored on one or more data storage systems or servers. Furthermore, the data storage systems may be local, remote, or a combination thereof to client systems, servers, or other system components. In another embodiment, information stored in the databases may be useful in providing additional personalizations and customizations.

By providing a unified messaging and modeling infrastructure (UMMI) according to the above embodiments, a more efficient, accurate, and comprehensive way may be provided for flowing and/or monitoring an order or other user-initiated request. Improved resource management, streamlined installations, and cost efficiencies may also be achieved.

Figure 4:
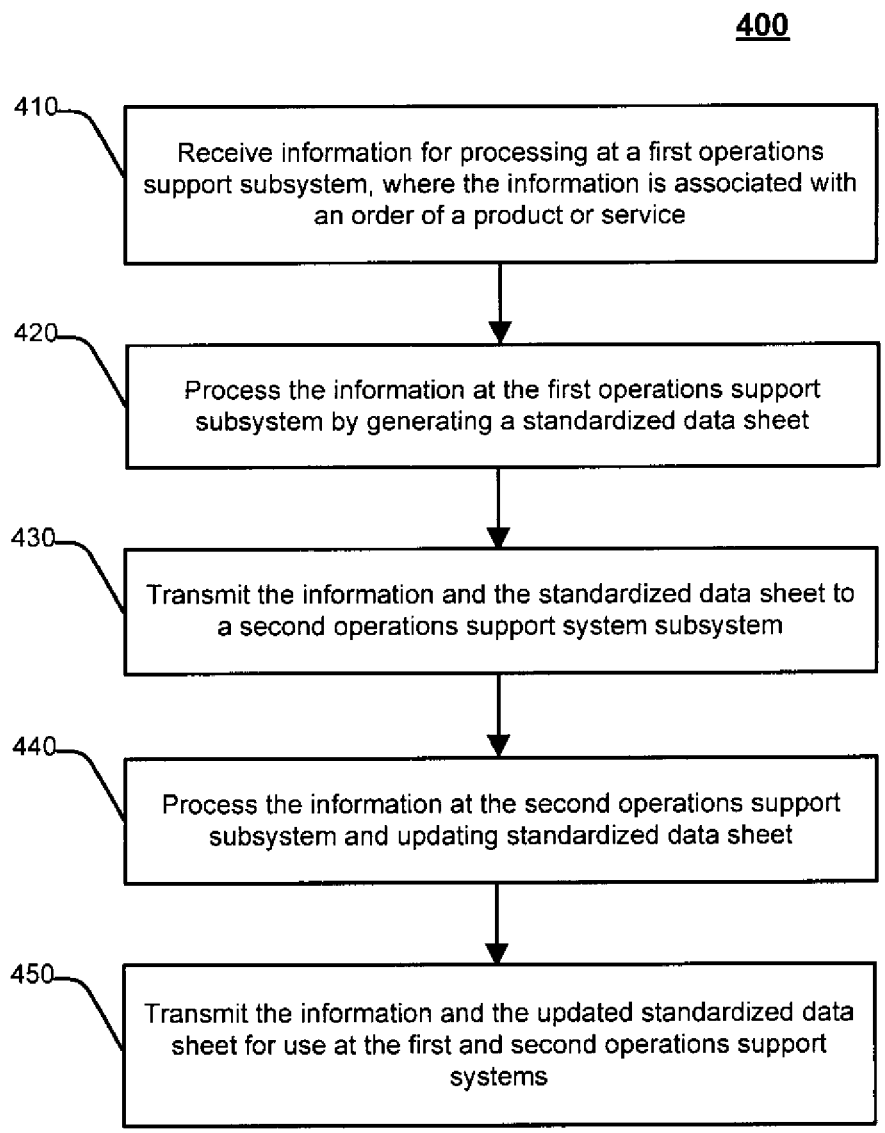
FIG. 4 depicts an illustrative flowchart of a method for using a unified messaging and modeling infrastructure (UMMI), according to an exemplary embodiment.

FIG. 4 depicts an illustrative flowchart of a method for using a unified messaging and modeling infrastructure (UMMI), according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1 and system 200 in FIG. 2, by way of example, and various elements of systems 100 and 200 are referenced in explaining the exemplary method of FIG. 4. Each block shown in FIG. 4 represents one or more processes, methods, or subroutines carried in the exemplary method 400. A computer readable medium comprising code to perform the acts of the method 400 may also be provided. Referring to FIG. 4, the exemplary method 400 may begin at block 410.

At block 410, the input module of the first operations support system (e.g., UMMI module subsystem 200a) may be configured to receive information for processing at the first operations support system. In some embodiments, the information for processing comprises a standardized data sheet for use with the first operations support system and at least a second operations support system. The standardized data sheet may comprise data attributes with properties, steps detailing data exchange between two or more operations support systems, and definition of interchange mechanisms. In some embodiments, the information for processing comprises an order for a product or service. In some embodiments, the first operations support system comprises a unified messaging and modeling infrastructure (UMMI) module subsystem for an order entry system.

At block 420, the processor module of the first operations support system may be configured to process the information received at the first input module. In some embodiments, processing may comprises generating a standardized data sheet for use with the first operations support system and at least a second operations support system. In some embodiments, the standardized data sheet comprises data attributes with properties, steps detailing data exchange between two or more operations support systems, and definition of interchange mechanisms. In some embodiments, the data attributes with properties comprises information associated to a customer identity, a customer location, and an order for a product or service. A standardized data sheet may be generated by an operation support system independent of systems used to process an order and the standardized data sheet may be stored centrally.

At block 430, the output module of the first operations support system may be configured to transmit the standardized data sheet to the input module of the second operations support system (e.g., the UMMI module subsystem 200b). In some embodiments, the second operations support system comprises a unified messaging and modeling infrastructure (UMMI) module subsystem for a provisioning system.

At block 440, the processor module of the second operations support system may be configured to update the standardized data sheet based on processing operations at the second operations support system. In some embodiments, the updated standardized data sheet may be configured to be used with the second operations support system and at least the first operations support system. In some embodiments, the updated standardized data sheet may be updated automatically by the processor module of the second operations support system.

At block 450, the output module of the second operations support system may be configured to transmit the updated standardized data sheet to at least the first operations support system.

The method 400 may further comprise an input module of a third operations support system (e.g., the UMMI module subsystem 200c) configured to receive at least the standardized data sheet generated by the processor module of the first operations support system and the updated standardized data sheet processed by the processor module of the second operations support system. The processor module of the third operations support system may be configured to further update the standardized data sheet based on processing operations at the third operations support system. In some embodiments, the further updated standardized data sheet may be configured to be used with the third operations support system and at least the first operations support system and second operations support system. The output module of the third operations support system may be configured to transmit the further updated standardized data sheet to at least the first operations support system. The third operations support system may comprise a unified messaging and modeling infrastructure (UMMI) module subsystem for a billing system.

It should be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In summary, embodiments may provide a system and method for comprehensively and effectively providing a unified messaging and modeling infrastructure (UMMI). It should be appreciated that although embodiments are described primarily with systems management technologies, the systems and methods discussed above are provided as merely exemplary and may have other various applications and implementations.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

We claim:

1. A system, comprising:
an input module of a first operations support system configured to receive information for processing at the first operations support system;
a processor module of the first operations support system configured to process the information received at the first input module, wherein processing comprises generating a standardized data sheet for use with the first operations support system and at least a second operations support system, the standardized data sheet defining a plurality of data value types for data input at the first and second operations support systems such that values of the data input at the first and second operations support systems are consistent between the second and first operations support systems, respectively, wherein the standardized data sheet further defines a plurality of data value lengths for the data in input at the first and second operations support systems;

an output module of the first operations support system configured to transmit the standardized data sheet to the second operations support system;

an input module of the second operations support system configured to receive the standardized data sheet generated by the processor module of the first operations support system;

a processor module of the second operations support system configured to update the standardized data sheet based on processing operations at the second operations support system, wherein the updated standardized data sheet is configured to be used with the second operations support system and at least the first operations support system, and wherein the processor module of the second operations support system is configured to receive and process information based on the definitions of the standardized data sheet; and an output module of the second operations support system configured to transmit the updated standardized data sheet to at least the first operations support system.

2. The system of claim 1, wherein receiving and processing information comprises at least one of: creating a table, updating a table, creating an interface definition, updating an interface definition, generating code, generating a hook for system customization, generating a GUI, compiling a version of interface infrastructure, hot deploying a staging version of infrastructure, and hot deploying an active version of interface infrastructure.

3. The system of claim 1, further comprising processing an order for a product or service using updated interface functionality based on the standardized data sheet.

4. The system of claim 1, wherein the standardized data sheet comprises data attributes with properties, steps detailing data exchange between two or more operations support systems, and definition of interchange mechanisms.

5. The system of claim 4, wherein the data attributes with properties comprises information associated to a customer identity, a customer location, and an order for a product or service.

6. The system of claim 1, wherein the first operations support system comprises a unified messaging and modeling infrastructure (UMMI) module subsystem for an order entry system.

7. The system of claim 1, wherein the second operations support system comprises a unified messaging and modeling infrastructure (UMMI) module subsystem for a provisioning system.

8. The system of claim 1, further comprising:

an input module of a third operations support system configured to receive at least the standardized data sheet generated by the processor module of the first operations support system and the updated standardized data sheet processed by the processor module of the second operations support system;

a processor module of the third operations support system configured to further update the standardized data sheet based on processing operations at the third operations support system, wherein the further updated standardized data sheet is configured to be used with the third operations support system and at least the first operations support system and second operations support system; and an output module of the third operations support system configured to transmit the further updated standardized data sheet to at least the first operations support system.

9. The system of claim 8, wherein the third operations support system comprises a unified messaging and modeling infrastructure (UMMI) module subsystem for a billing system.

10. The system of claim 1, wherein the updated standardized data sheet is updated automatically by the processor module of the second operations support system.

11. A method comprising:

receiving information for processing at an input module of a first operations support system;

processing the information at a processor module of the first operations support system, wherein processing the information comprises generating a standardized data sheet for use with the first operations support system and at least a second operations support system, the standardized data sheet defining a plurality of data value types for data input at the first and second operations support systems, wherein the standardized data sheet further defines a plurality of data value lengths the for the data input at the first and second operations support systems;

transmitting the information and the standardized data sheet by an output of the first operations support system to an input of the second operations support system;

processing the information and the standardized data sheet by a processor module of the second operations support system, wherein processing the standardized data sheet comprises updating the standardized data sheet based on the information and providing interface functionality based on the definitions in the standardized data sheet, wherein the updated standardized data sheet is configured to be used with the second operations support system and at least the first operations support system; and transmitting the information and the updated standardized data sheet by at least an output module of the second operations support system to at least the first operations support system.

12. The method of claim 11, wherein providing interface functionality based on the definitions in the standardized data sheet comprises at least one of: creating a table, updating a table, creating an interface definition, updating an interface definition, generating code, generating a hook for system customization, generating a GUI, compiling a version of interface infrastructure, hot deploying a staging version of infrastructure, and hot deploying an active version of interface infrastructure.

13. The method of claim 11, further comprising processing an order for a product or service using updated interface functionality based on the standardized data sheet.

14. The method of claim 11, wherein the standardized data sheet comprises data attributes with properties, steps detailing data exchange between two or more operations support systems, and definition of interchange mechanisms.

15. The method of claim 11, wherein the data attributes with properties comprises information associated to a customer identity, a customer location, and an order for a product or service.

16. The method of claim 11, wherein the first operations support system comprises a unified messaging and modeling infrastructure (UMMI) module subsystem for an order entry system.

17. The method of claim 11, wherein the second operations support system comprises a unified messaging and modeling infrastructure (UMMI) module subsystem for a provisioning system.

18. The method of claim 11, further comprising:
receiving, at an input module of a third operations support system, at least the standardized data sheet generated by the processor module of the first operations support system and the updated standardized data sheet processed by the processor module of the second operations support system;
updating, at a processor module of the third operations support system, the standardized data sheet based on processing operations at the third operations support system, wherein the further updated standardized data sheet is configured to be used with the third operations support system and at least the first operations support system and second operations support system; and
transmitting, using an output module of the third operations support system, the further updated standardized data sheet to at least the first operations support system.

19. The method of claim 18, wherein the third operations support system comprises a unified messaging and modeling infrastructure (UMMI) module subsystem for a billing system.

20. The method of claim 11, wherein the updated standardized data sheet is updated automatically by the processor module of the second operations support system.

21. A non-transitory computer readable medium comprising code which when executed causes a computer to perform the steps of:
receiving information for processing at an input module of a first operations support system;
processing the information at a processor module of the first operations support system, wherein processing the information comprises generating a standardized data sheet for use with the first operations support system and at least a second operations support system, the standardized data sheet defining a plurality of data value types for data input at the first and second operations support systems, wherein the standardized data sheet further defines a plurality of data value lengths for the data in input at the first and second operations support systems;
transmitting the information and the standardized data sheet by an output of the first operations support system to an input of the second operations support system;
processing the information and the standardized data sheet by a processor module of the second operations support system, wherein processing the standardized data sheet comprises updating the standardized data sheet based on the information and providing interface functionality based on the definitions in the standardized data sheet, wherein the updated standardized data sheet is configured to be used with the second operations support system and at least the first operations support system; and
transmitting the information and the updated standardized data sheet by at least an output module of the second operations support system to at least the first operations support system.

22. The system of claim 1, wherein the definitions of the standardized data sheet are defined prior to being received by the input module of the first operations support system.

23. The system of claim 1, wherein prior to receiving the information, the first operations support system and the second operations support system utilized data stored in different formats.

* * * * *